(12) United States Patent
Fujii et al.

(10) Patent No.: US 6,644,726 B2
(45) Date of Patent: Nov. 11, 2003

(54) VEHICLE REAR BODY STRUCTURE

(75) Inventors: Kanji Fujii, Saitama (JP); Toshiki Takahashi, Saitama (JP); Takaya Okuyama, Saitama (JP); Yoshimi Mizutani, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/230,396

(22) Filed: Aug. 29, 2002

(65) Prior Publication Data

US 2003/0062743 A1 Apr. 3, 2003

(30) Foreign Application Priority Data

Aug. 29, 2001 (JP) ........................................ 2001-260348

(51) Int. Cl.[7] .............................................. B60R 27/00
(52) U.S. Cl. ................. 296/203.04; 296/195; 293/120; 180/309; 181/227
(58) Field of Search ........................... 296/203.04, 195; 293/120, 121, 122, 113; 180/309; 181/227

(56) References Cited

U.S. PATENT DOCUMENTS

| 3,827,740 A | * | 8/1974 | Golze et al. | |
| 3,836,188 A | * | 9/1974 | Klees | |
| 3,884,516 A | * | 5/1975 | Gallion et al. | |
| 3,933,387 A | * | 1/1976 | Salloum et al. | |
| 4,186,915 A | * | 2/1980 | Zeller et al. | 293/122 |
| 4,397,490 A | * | 8/1983 | Evans et al. | 293/120 |
| 4,408,790 A | * | 10/1983 | Shimoda et al. | 293/122 |
| 4,474,395 A | * | 10/1984 | Harloff et al. | 293/120 |
| 4,653,795 A | * | 3/1987 | Soderberg | |
| 4,765,665 A | * | 8/1988 | Akahoshi | 293/121 |
| 6,354,641 B1 | * | 3/2002 | Schroeder et al. | 293/122 |
| 6,398,275 B1 | * | 6/2002 | Hartel et al. | 293/120 |
| 6,439,650 B2 | * | 8/2002 | Artner et al. | 293/120 |
| 6,471,377 B1 | * | 10/2002 | Stegall | 180/309 |

FOREIGN PATENT DOCUMENTS

JP 2001-82142 3/2001

OTHER PUBLICATIONS

British Office Action dated Nov. 25, 2002.

* cited by examiner

Primary Examiner—Joseph D. Pape
Assistant Examiner—H. Gutman
(74) Attorney, Agent, or Firm—Armstrong, Westerman & Hattori LLP

(57) ABSTRACT

In a vehicle rear body structure in which a muffler is disposed below a rear cross member disposed to extend transversely below a rear part of the body of a vehicle, a lower end portion 10 of the rear cross member 7 extends downwardly to substantially the same height of that of a lower end portion 4c of a rear bumper face 4a disposed rearward of the rear cross member. Accordingly, it is possible to prevent the generation of heat deformation by protecting from heat related effects from a muffler a lower end portion of a rear bumper which tends to easily heat deform.

10 Claims, 3 Drawing Sheets

VEHICLE REAR BODY STRUCTURE

BACKGROUND OF THE INVENTION

The present invention relates to a vehicle rear body structure for preventing heat from influencing a rear bumper by an exhaust muffler disposed at a rear of a vehicle body.

An exhaust muffler is disposed under the floor at a rear part of the vehicle body so as to be oriented in a longitudinal direction. In this muffler, a rear end face of a main body of the muffler faces closely a rear end portion of the rear part of the vehicle body and a tailpipe for discharging exhaust gases is extended to the rear from the rear end face of the muffler.

Incidentally, a bumper is disposed at a lower rear end portion of the vehicle body, and in many cases synthetic resin bumpers are adopted from the viewpoint of improved impact absorption properties, formability, external appearance and the like. On the other hand, the rear end portion of the muffler main body which is heated faces closely the front of such a synthetic resin bumper, and therefore, there is a risk exists that the bumper face may deform from heat effects resulting from the heated muffler so disposed.

To cope with the risk, countermeasures are conventionally taken thereagainst which are illustrated in FIGS. 3 and 4.

FIG. 3 is a longitudinally cross-sectional side view explaining a lower main portion of a rear part of the vehicle body which shows an example of the related art.

In the figure, reference numeral 51 denotes a rear cross member provided in a transverse direction of the vehicle body at the rear part thereof, and the rear cross member is provided to extend between rear end portions of left and right side members 52. A rear bumper 54 is disposed rearward of the rear cross member 51. A bumper face 54a of the rear bumper 54 confronts the rear cross member 51.

A muffler 53 is disposed below the rear cross member 51 in such a manner as to be oriented in a longitudinal direction of the body. An exhaust tailpipe 53c is provided to protrude to the rear from a rear end face 53b of a cylindrical main body 53a having a large diameter, and the rear end face 53b of the muffler 53 approaches a bottom piece portion 54b bent to the front from a lower end portion of the bumper face 54a of the rear bumper 54, whereby that portion of the rear bumper is easily subjected to heat deformation.

As a result, part of the bottom piece portion 54b of the rear bumper 54 is cut to the rear to provide a notched portion 55 so that the closely disposed muffler 53 and rear bumper 54 are spaced away from each other via the notched portion 55 so provided to thereby prevent the heat deformation of the rear bumper at that portion that would otherwise result from heat dissipated from the muffler 53.

With the countermeasures illustrated in FIG. 3, since the bottom piece portion 54b of the rear bumper 54 which is easily heat deformed is cut to provide the notched portion 55, there are caused problems that the structure is not preferable to the quality in external appearance and that since part of every bumper has to be cut, the cutting work is complicated and troublesome.

FIG. 4 is a longitudinally sectional side view of a lower main portion of a rear part of the body of a vehicle which illustrates another example of the related art.

In this countermeasures, a muffler 53 is covered with a heat shield 56, and the heat shield 56 comprises an upper plate portion 56a for covering at least from a rear portion to a rear-half portion of a main body 53a of the muffler and an end plate portion 56b which is bent from a rear end portion of the upper plate portion 56a to suspend downwardly therefrom for covering at least an upper-half portion of a rear end face 53b of the muffler 53.

The heat shield 56 prevents heat related effects on the portion of the rear bumper 54 which is easily heat deformed especially at the end plate portion 56b.

With the countermeasures illustrated in FIG. 4, while several inconveniences are caused by the provision of the notched portion in the rear bumper shown in FIG. 3, the following inconveniences are also caused. Namely, since the heat shield is needed, the number of parts is increased. Since supporting members and a supporting structure are separately needed for the heat shield, the structure of the rear part of the body becomes complicated. As a result, the structure is disadvantageous from the cost and weight point of view. In addition, since the heat shield is provided above the muffler under the rear part of the body where the space is limited between the muffler and the body, the capacity of the muffler is reduced, this leading to a risk that the performance of the muffler is affected.

SUMMARY OF THE INVENITON

The invention was made to solve the problems. It is an object of the present invention to provide a vehicle rear body structure for ensuring the prevention of heat related effects of a muffler on a rear bumper without substantially modifying any of the original configuration and structure of the rear bumper by, for example, providing a notched portion and hence damaging the external appearance of the rear bumper and implementing the prevention with a simple structure while reinforcing a rear part of the vehicle body.

In an attempt to solve the problems, according to a first aspect of the invention, there is provided a vehicle rear body structure in which a muffler is disposed below a rear cross member disposed in a transverse direction at a lower portion of a rear part of a vehicle body. In the vehicle rear body structure, a lower end portion of the rear cross member is extended downwardly to reach substantially the same height as that of a lower end portion of a rear bumper face disposed rearward of the rear cross member.

According to the first aspect of the invention, the lower end portion of the rear cross member which is extended downwardly to substantially the same height as that of the lower end portion of the rear bumper face is interposed between the rear end portion (rear end face) of the muffler and the rear bumper to function as something like a heat shield, whereby the effects of heat radiating from the muffler on a part of the rear bumper, which easily heat deforms, is thereby to protect the rear bumper from the heat from the muffler.

DETAILED DESCRIPTION OF THE PREFERRED EMBODIMENT

Figure 1:
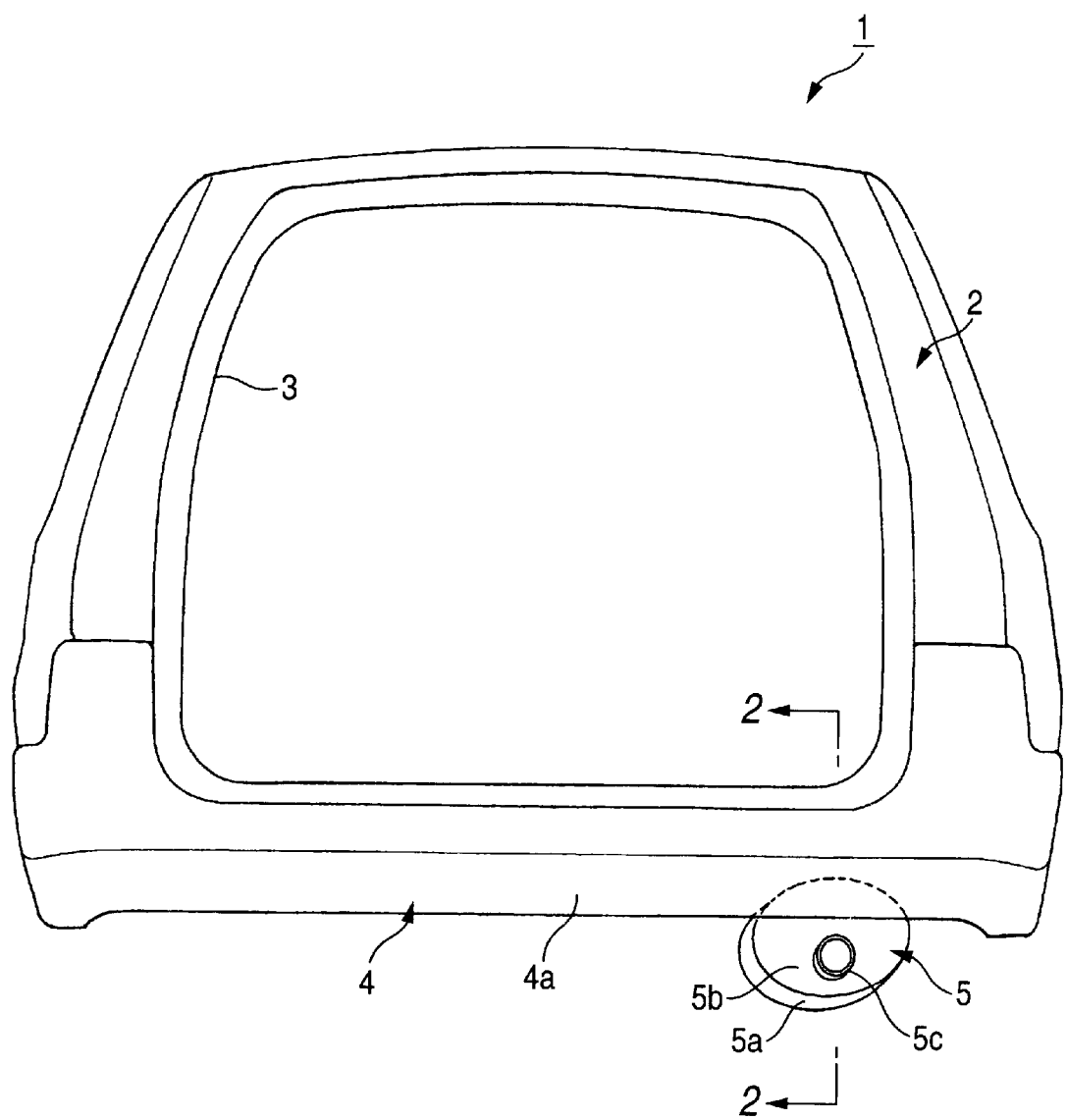
FIG. 1 shows an explanatory back view of a rear part of the body of a vehicle.

An embodiment of the invention will be described below with reference to the accompanying drawings. Note that the drawings are to be viewed in a direction in which reference numerals are oriented.

FIG. 1 is an explanatory back view of a rear part of a vehicle body.

The figure is a back view of a rear gate portion 2 of the vehicle 1 with a rear door for closing a rear opening 3 and rear wheels being omitted, and a rear bumper 4 is disposed at a lower portion of the gate portion 2 in such a manner as to extend in a transverse direction of the body over the overall width of the vehicle.

A muffler 5 connecting to a rear part of an engine exhaust pipe is disposed in front of a right-hand side of the rear bumper 4 in such a manner as to be oriented in a longitudinal direction of the body.

An upper-half portion of a rear end portion 5b (rear end face) of a main body 5a of the muffler 5 is concealed by the right-hand side portion of a rear bumper face 4a of the rear bumper 4 and a lower-half portion thereof is exposed to the rear. A tail pipe 5c for discharging exhaust gases is disposed below a lower end portion of the rear bumper 4 in such a manner as to open toward the rear.

Figure 2:
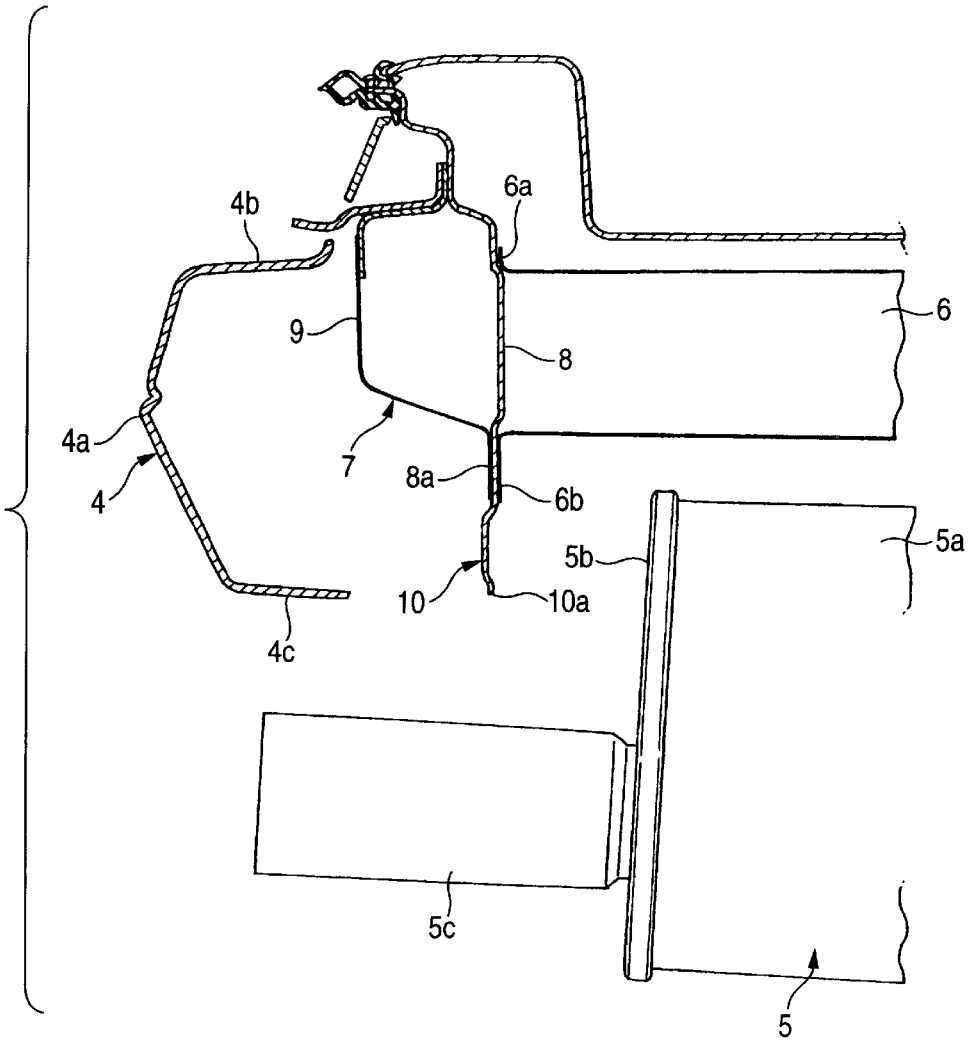
FIG. 2 shows an enlarged sectional view taken along the line 2—2 in FIG. 1.

FIG. 2 is an enlarged sectional view taken along the line 2—2 in FIG. 1.

In the figure, reference numeral 6 denotes one of left and right side members, and a rear cross member 7 is provided to extend between rear end portions of the side members and is joined thereto. The rear cross member 7 is a hollow structure having a closed cross section constituted by an inner 8 element and an outer element 9 which are joined together. Flange portions 6a, 6b provided at the rear end portion of the side member 6 in such a manner as to extend vertically are welded to upper and lower portions of a face of the inner 8 which faces to the front of the vehicle, and upper and lower portions of the outer 9 which is disposed rearward are welded to upper and lower portions of a rear face of the inner element 8, whereby the inner element 8 and the outer element 9 are integrated to the side members 6.

The rear cross member 7 is situated at a rearmost portion of the body as a vehicle body constituent member, and the rear bumper 4 made of a synthetic resin is disposed rearward of the rear cross member in such a manner as to extend in the transverse direction of the body as has been described above. The rear bumper 4 comprises the bumper face 4a which is spaced away to the rear from the rear cross member 7 in such a manner as to confront it, an upper shelf piece portion 4b which is bent from an upper end portion of the rear bumper face 4a to the front so as to extend forward and a lower bottom piece portion 4c which is bent from a lower end portion of the rear bumper face 4a to the front so as to extend forward.

Consequently, the rear bumper 4 is formed substantially into an angular C-shaped configuration.

The rear end portion 5b of the muffler 5 is situated in front of the bottom piece portion 4c of the rear bumper 4 in such a manner that an upper-half portion of the muffler 5 is covered with the bumper face 4a of the rear bumper 4, and a lower end portion of the inner element 8 of the rear cross member 7 is situated between the rear end portion 5b of the muffler 5 and the bottom piece portion 4c of the rear bumper 4.

In the above rear bumper structure, the rear cross member 7 is constructed as below.

A lower portion of the rear cross member 7 suspends and extends downwardly. In this embodiment, the lower portion 8a of the inner element 8 suspends and extends downwardly, and an extension 10 which extends downwardly is provided integrally with the lower portion 8a of the inner element 8. Consequently, the extension 10 is part of the rear cross member 7 which extends downwardly as an integral part of the rear cross member 7.

A lower end portion 10a of the extension 10 of the rear cross member 7 is situated at the same height as that of the bottom piece portion 4c which constitutes the lower end portion of the rear bumper 4.

According to this structure, the downward extension 10a of the rear cross member 7 has its lower end portion 10 situated at the same height as that of the lower end portion of the bumper face 4a of the rear bumper 4 and is then situated between the bottom piece portion 4c of the rear bumper 4 and the upper-half portion of the rear end portion 5b of the muffler 5 which is disposed in front of the bottom piece portion 4c of the rear bumper 4.

Thus, the extension 10a of the rear cross member 7 is disposed in front of the bottom piece portion 4c of the rear bumper 4 which is situated close to the rear end portion 5b of the muffler 5 and hence is easily subjected to the effects of heat radiating from the rear end face of the muffler 5 and suppresses the effects of heat radiating from the rear end face of the muffler 5, whereby the heat deformation of the bottom piece portion 4c of the rear bumper 4 and the effects of the heat deformation on the bumper surface 4a attributed to the heat deformation of the bottom piece portion 4c can be prevented, thereby making it possible to realize the installation of the rear bumper 4 which is stable and is not affected in configuration by the heat effects of the muffler 5 and has no effect on the quality in external appearance.

In addition, since the extension 10 is situated at the same height as that of the bottom piece portion 4c of the rear bumper 4, the extension 10 remains invisible when viewed from the rear of the vehicle, providing a good external appearance.

Incidentally, the extension 10 of the rear cross member 7 is provided so as to extend transversely along the full length of the rear cross member 7, and therefore, the extension 10 suspends and extends integrally downwardly along the full length of the rear cross member 7. Consequently, when compared with a conventional structure in which no extension is provided on the rear cross member, the rigidity of the rear cross member 7 of the embodiment can serve to increase its rigidity, and as a result, this improvement in rigidity of the rear cross member 7 contributes to the improvement in rigidity of the structure of the rear part of the body of the vehicle.

Figure 3:
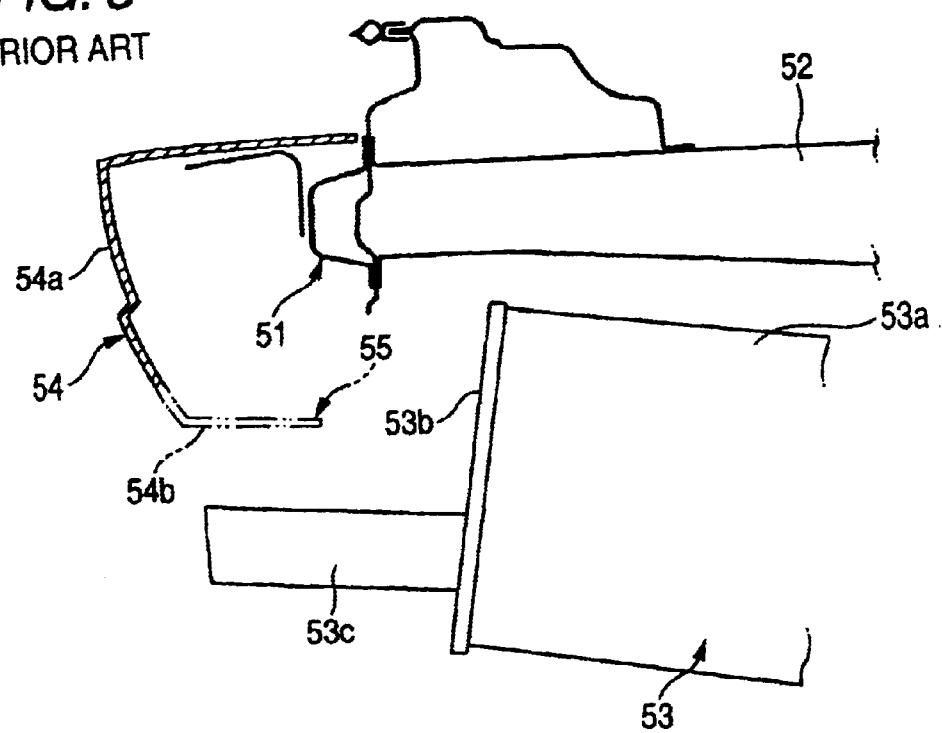
FIG. 3 shows an explanatory longitudinal sectional view of a lower main portion of a rear part of the body of a vehicle according to one example of related art.

In addition, since the lower end portion of one of the constituent members of the rear cross member 7 only is suspended and extends downwardly, the configuration of the rear bumper does not have to be modified as done with the conventional example shown in FIG. 3. Furthermore, no additional heat shield needs to be installed as a separate member, and the support members and support structure for the heat shield are not required separately, both being required in the conventional example shown in FIG. 4.

Thus, while the embodiment of the invention has been described heretofore in which the extension 10 is formed by extending the lower end portion of the inner 8 of the rear cross member 7 in such a manner as to suspend downwardly, the extension may be formed by extending a lower portion of the outer element 9 to suspend downwardly.

The following advantage will be provided by the structure of the invention described above.

According to the first aspect of the invention, there is provided the vehicle rear body structure in which the muffler is disposed below the rear cross member disposed in the transverse direction at the lower portion of the rear part of the vehicle body. In the vehicle rear body structure, the lower end portion of the rear cross member is extended downwardly to reach substantially the same height as that of the lower end portion of the rear bumper face disposed rearward of the rear cross member.

According to the structure of the first aspect of the invention, the lower end portion of the rear cross member which is extended downwardly to substantially the same height as that of the lower end portion of the rear bumper face is interposed between the rear end portion (rear end face) of the muffler and the rear bumper to function as something like a heat shield.

Consequently, the effects of heat radiating from the muffler on the part of the rear bumper which easily heat deforms is suppressed by the lower end portion of the rear cross member which extends downwardly, whereby the rear bumper is protected from the heat from the muffler.

Figure 4:
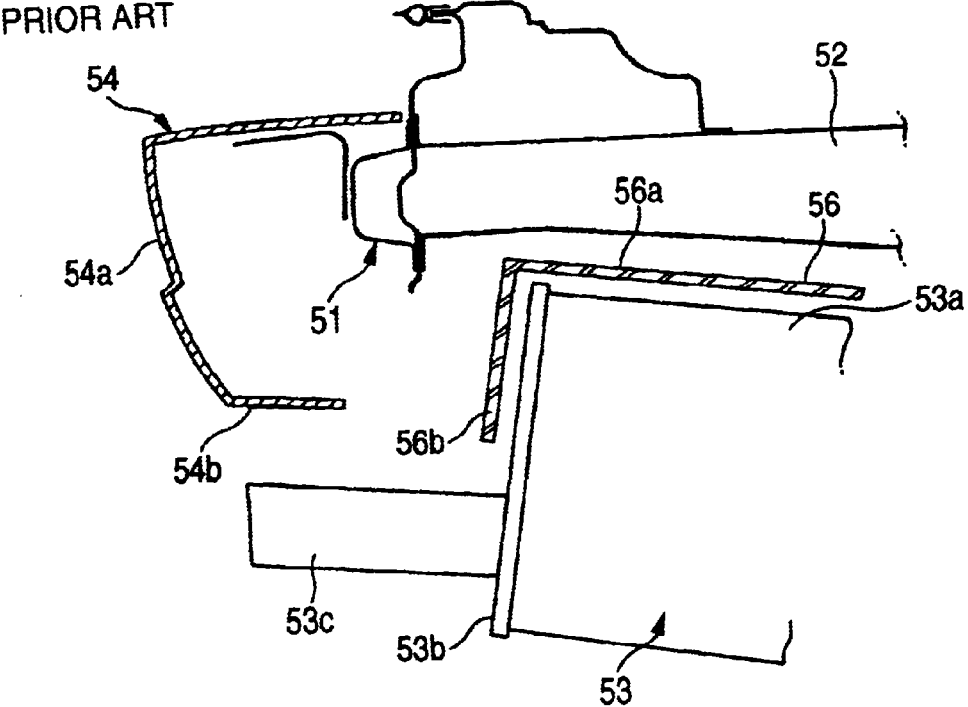
FIG. 4 shows an explanatory longitudinal sectional view of a lower main portion of a rear part of the body of a vehicle according to another example of related art.

In particular, according to the invention, since the lower end portion of the rear cross member only has to be caused to extend downwardly, the number of components is not increased, which is the case with the conventional example shown in FIG. 4, and therefore, the rear bumper can effectively be shielded from heat from the muffler with the simple structure.

In addition, according to the invention, since the lower end of the rear cross member is caused to extend downwardly at the position which is spaced away to the front from the rear bumper so as to function as a so-called heat shield, there is no need to provide a notched portion in the rear bumper, and therefore, the invention is also advantageous in that the quality in external appearance can be improved.

Furthermore, according to the invention, since the rear cross member extends downwardly, the rigidity of the rear cross member itself can be improved, and as a result, the improvement can contribute to the improvement in rigidity of the body of the vehicle.

What is claimed is:

1. A vehicle rear body structure comprising:
   a rear cross member extending in a vehicle transverse direction and disposed at a lower portion of a rear part of a vehicle body;
   a rear bumper face disposed rearward of said rear cross member; and
   a muffler disposed adjacent to said rear cross member,
   wherein said rear cross member has a lower end portion that extends downwardly to reach substantially the same height as that of a lower end portion of said rear bumper face,
   wherein the lower end portion of the rear cross member is not connected to the rear bumper face and a gap exists between the lower end portion and the rear bumper face.

2. The vehicle rear body structure according to claim 1, wherein the rear cross member is a hollow structure having a closed cross section.

3. The vehicle rear body structure according to claim 2, wherein the closed cross section of the rear cross member is constituted by an inner element and an outer element which are joined to each other.

4. The vehicle rear body structure according to claim 3, wherein said lower end portion of said rear cross member is a lower end portion of said inner element.

5. The vehicle rear body structure according to claim 4, further comprising:
   left and right side members between which said rear cross member extends,
   wherein each of the side members has flange portions that are provided at a rear end portion so as to extend vertically.

6. The vehicle rear body structure according to claim 5, wherein the flange portions of each of the side members are respectively welded to upper and lower portions of the inner element.

7. The vehicle rear body structure according to claim 6, wherein upper and lower portions of the outer element are welded to the upper and lower portions of the inner element, thereby integrating the inner element and the outer element to the side members.

8. The vehicle rear body structure according to claim 1, wherein the rear bumper face has a substantialy c-shaped cross section.

9. The vehicle rear body structure according to claim 1, wherein the rear bumper face is made of a synthetic resin.

10. The vehicle rear body structure according to claim 1, wherein the muffler is disposed below said rear cross member.

* * * * *